United States Patent

[11] 3,609,450

[72] Inventor Atlee S. Hart, Huntington Woods, Mich.
[21] Appl. No. 800,930
[22] Filed Feb. 20, 1969
[45] Patented Sept. 28, 1971
[73] Assignee Lindor Electronics, Inc., Huntington Woods, Mich.

[54] AUTOMATIC HEADLIGHT-WASHING SYSTEM
8 Claims, 4 Drawing Figs.

[52] U.S. Cl. .................................................... 315/82, 240/7.1, 250/227, 250/215, 315/151, 315/159
[51] Int. Cl. ....................................................... F21m 3/00, B60s 1/56, G05b 11/16
[50] Field of Search............................................ 250/215, 216–218, 201, 205, 229; 240/7.1; 315/82, 151, 159

[56] References Cited
UNITED STATES PATENTS

| | | | |
|---|---|---|---|
| 2,337,535 | 12/1943 | ACS............................ | 250/215 |
| 2,890,353 | 6/1959 | Overbeck et al............. | 250/215 |
| 3,192,391 | 6/1965 | Ressler........................ | 250/227 |
| 3,469,088 | 9/1969 | Coleman et al.............. | 240/7.1 |
| 3,117,727 | 1/1964 | Pollock et al................ | 240/7.1 |
| 3,144,561 | 8/1964 | Farrell........................ | 250/217 |
| 3,423,633 | 1/1969 | Kawai et al.................. | 315/159 X |

Primary Examiner—John W. Huckert
Assistant Examiner—William D. Larkins
Attorney—Hauke, Krass, Gifford and Patalidis ABSTRACT: A vehicle headlight washer that is automatically actuated by a photocell actuator whenever the intensity of the light being passed through the headlight lens is reduced to a predetermined level by road grime and the like.

PATENTED SEP 28 1971 3,609,450

INVENTOR
ATLEE S. HART
BY
Hauke Knass Gifford & Patalidis
Attorneys

AUTOMATIC HEADLIGHT-WASHING SYSTEM

BACKGROUND OF THE INVENTION

This invention relates to systems for cleaning a lens disposed in front of a light source, and more particularly to a system for automatically cleaning a vehicle headlight lens.

It is well known that during wet weather and the like, vehicle headlights tend to become covered with mud and road grime which reduces their effective illumination of the roadway. The resulting reduced visibility often poses a driving hazard. The prior art teaches that it is old to provide a washer that is mounted adjacent the headlight and remotely energized by the vehicle operator to clean the headlight lens. Such art shows how the washer can be either energized independently or concurrently with the windshield washer unit. Typical devices of this character are shown in U.S. Pat. Nos. 3,058,142 and 3,289,237.

One problem with such prior art washing systems is that they do not provide for an indicator that informs the operator of the headlights' output. Because of the lower position of the headlights on the vehicle, the condition of the windshield is not a reliable indication of the condition of the headlights. Therefore the operator is not always immediately aware that the headlights are covered with grime and require washing.

SUMMARY OF THE INVENTION

The broad purpose of the present invention is to provide means for cleaning the headlight lens whenever the intensity of the light being passed through the lens is reduced to a predetermined level. The preferred embodiment of the invention cleans the headlight lens automatically and does not require the attention of the vehicle's operator. It employs a nozzle for discharging a pressurized cleaning solvent on the headlamp lens and could be coupled with a suitable wiper unit in order to assist the cleaning action.

The preferred embodiment employs a photocell actuator having a sensing element arranged to sense the intensity of the light being passed through the lens. When the light intensity is reduced below a predetermined level, an output signal is provided which energizes the washer. A time delay device causes the washer to be energized for a suitable interval to clean the lens.

In another embodiment of the invention, the photocell actuator is employed to energize an indicator light when the headlight clarity is reduced. The operator then manually energizes the headlight washer. This latter embodiment illustrates the concept of employing a light sensor for automatically energizing an electrical device other than a washer in accordance with the light intensity of a headlight mounted on the same vehicle as the electrical device.

Still further advantages and objects of the invention will become readily apparent to those skilled in the art to which it pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
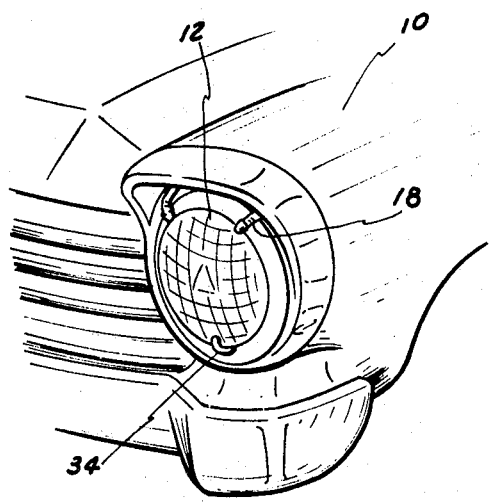
FIG. 1 is a perspective fragmentary view of a vehicle having a headlight and an automatic washer illustrating the preferred embodiment of the invention.
Figure 2:
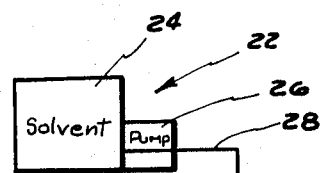
FIG. 2 is an enlarged sectional view of the headlight of FIG. 1 with a portion of the washer system schematically illustrated.
Figure 2:
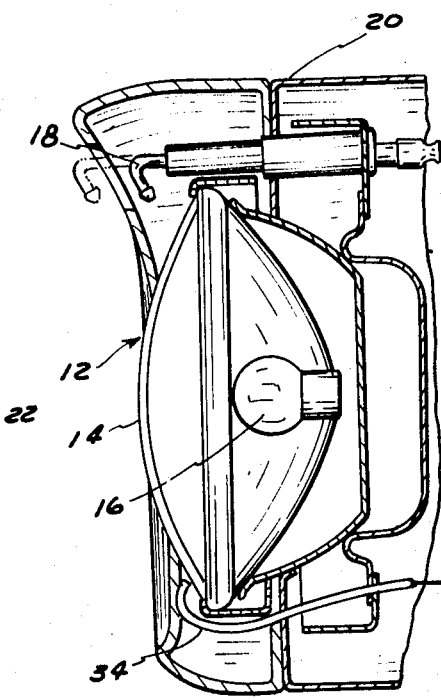

Referring to the drawing, a preferred headlight-washing system is mounted on a vehicle 10 for cleaning a headlight 12. The headlight 12 is conventional and has a dish-shaped transparent lens 14 supported in front of a lamp 16 which provides a light source. When energized, the lamp 16 passes light through the lens 14 to illuminate the roadway along which the vehicle 10 is being driven. As best illustrated in FIG. 2, a washer nozzle 18, mounted within the hood 20 of the vehicle, has an outlet directed toward the exterior surface of the lens 14.

The nozzle 18 is connected to a washer means 22 which is suitably mounted on the vehicle 10, as within the engine compartment. For purposes of illustration the washer means 22 includes a container 24 of a suitable washing solvent, such as windshield washer fluid, and an electrical pump 26 for pumping solvent from the container 24 through a conduit 28 to the nozzle 18. Such washer systems are well known for delivering solvent to windshield washers and the like so that a further description of such a system is not necessary in order for one skilled in the art to practice the invention. Although an electrically actuated washer is illustrated, other means could be employed for delivering pressurized solvent to the nozzle 18.

A photocell actuator unit 30 is also mounted on the vehicle 10 in a suitable location such as the vehicle engine compartment. The photocell actuator includes a photocell 32 and a lucite rod 34 for transmitting from the headlight to the receiver. The rod 34 has a bent outer end mounted adjacent the lower edge of the lens in such a manner as to transmit light to its opposite end which is disposed adjacent the receiver 32. Thus the receiver senses the intensity of the light being passed through the lens 14.

Figure 3:
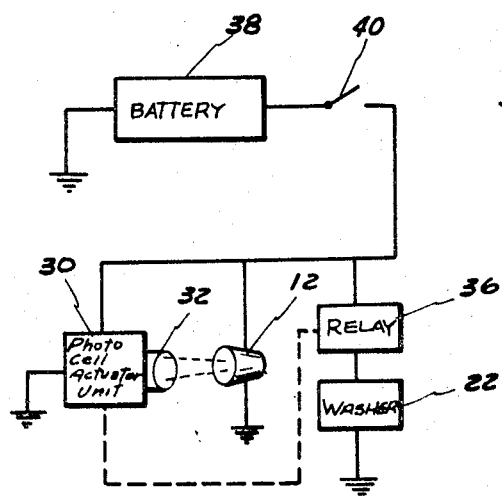
FIG. 3 is a schematic illustration of the preferred automatic washer system.

The photocell actuator unit 30, as best shown in FIG. 3, is electrically connected to a timer relay 36 which in turn is connected to the washer pump 26. The photocell 32 is a light-sensitive element having an internal resistance that varies as the intensity of the light being transmitted through the rod 34. When the light intensity is reduced to a predetermined level, the cell 32 causes the actuator unit to energize the timer relay 36 which controls the operation of pump 22.

Referring to FIG. 3, the electrical circuitry of the vehicle 10 includes a battery 38 which provides a source of electrical energy to the headlight 12. The actuator unit 30 is also connected to the battery 38 so as to be energized whenever the headlight 12 is electrically energized. The timer relay 36 is operable to electrically connect the washer pump 26 to the battery 38 for predetermined time interval which is sufficient to clean the lens 14. A switch 40 allows the operator to either energize or deenergize the headlight 12.

Figure 4:
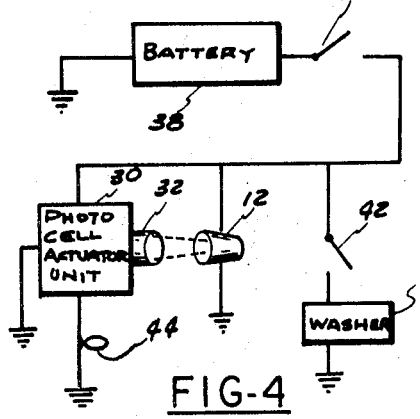
FIG. 4 is a schematic illustration of a modified washer system.

FIG. 4 illustrates a modified version of the invention in which a switch 42 is connected between the battery 38 and the washer 22 to allow the operator to manually energize the washer. The photocell actuator unit 30 is connected to an indicator light 44 which is disposed to inform the operator of the headlights' clarity. The actuator unit 30 energizes the indicator light 44 when the cell 32 responds to a reduced light intensity from the headlight. The operator is thereby informed of the headlights' condition and can close switch 42 to clean the headlight lens.

It is to be understood that although I have described only two headlight washer systems, the individual components of these systems can take various configurations. For instance, the actuator could be adjustable in order to vary the amount of light reduction necessary to initiate the cleaning action. The lucite rod 30 could be replaced by a fiber optic rod or other means for transmitting light from the exterior of the headlamp lens to the photocell receiver 32.

Having described my invention, I claim:

1 Cleaning apparatus for a lens disposed to pass light from an energized light source, comprising a light sensor for sensing the intensity of light being passed by the lens from the energized light source; washer means for washing the lens; and means connected to the light sensor to automatically actuate the washer means whenever the light intensity of the energized source is reduced to a predetermined level.

2. The combination as defined in claim 1, including timer means connected to the sensor for automatically energizing the washer means for a predetermined time interval after the light intensity is reduced to said predetermined level.

3. The combination as defined in claim 1, in which the light sensor includes a photocell receiver, and an elongated element of light-transmitting material having one end adjacent the lens to receive light being passed therethrough, and its other end disposed adjacent the photocell receiver to transmit light being received by said one end.

4. The combination as defined in claim 1, in which the washer means includes a source of a liquid solvent, nozzle means connected to the solvent source and mounted adjacent the lens, and means for pumping the solvent from its source to the nozzle means.

5. An automatic washing system for a forward facing vehicular exterior lamp comprising: a fluid source, fluid conduit means on the vehicle for discharging fluid from the source onto the surface of the lamp, photosensitive means on the vehicle for monitoring the intensity of light produced by the lamp and for producing an electrical signal quantity related to said intensity, and actuator means on the vehicle operatively connected to the photosensitive means and the conduit means for causing fluid to flow from the source through the conduit means whenever the electrical signal quantity indicates that the light intensity is less than a predetermined value.

6. Apparatus as defined in claim 5 wherein the fluid conduit means includes a nozzle having a portion directed toward the lamp.

7. Apparatus as defined in claim 5 wherein the actuator means includes a pump connected between the source and the conduit means.

8. Apparatus as defined in claim 5 wherein the photosensitive means includes a light-transmitting optical element having an input end and an output end, the element being disposed on the vehicle with the input end adjacent the lamp to receive light therefrom.